(12) United States Patent
Huang et al.

(10) Patent No.: US 9,390,140 B2
(45) Date of Patent: Jul. 12, 2016

(54) COMMUNICATION-POWERED SEARCH

(71) Applicant: Microsoft Technology Licensing, LLC, Redmond, WA (US)

(72) Inventors: Xuedong David Huang, Bellevue, WA (US); Zheng Chen, Beijing (CN); Zhimin Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 13/774,503

(22) Filed: Feb. 22, 2013

(65) Prior Publication Data

US 2014/0244629 A1    Aug. 28, 2014

(51) Int. Cl.
*G06F 17/30* (2006.01)
*G06Q 50/00* (2012.01)

(52) U.S. Cl.
CPC ...... *G06F 17/3053* (2013.01); *G06F 17/30867* (2013.01); *G06F 17/30648* (2013.01); *G06F 17/30991* (2013.01); *G06Q 50/01* (2013.01)

(58) Field of Classification Search
CPC ............... G06Q 50/01; G06F 17/3053; G06F 17/30991; G06F 17/30648
USPC ........................................................ 707/723
See application file for complete search history.

(56) References Cited

U.S. PATENT DOCUMENTS

| 6,425,012 | B1 * | 7/2002 | Trovato et al. ................ 709/227 |
| 6,745,178 | B1 | 6/2004 | Emens et al. |
| 8,117,196 | B2 | 2/2012 | Jones et al. |
| 8,180,676 | B2 | 5/2012 | Altberg et al. |
| 8,775,355 | B2 * | 7/2014 | Kshetramade et al. ....... 705/319 |
| 2006/0271524 | A1 * | 11/2006 | Tanne et al. ....................... 707/3 |
| 2009/0006333 | A1 | 1/2009 | Jones et al. |
| 2010/0114938 | A1 | 5/2010 | Weng |
| 2010/0211899 | A1 | 8/2010 | Fujioka |
| 2011/0071898 | A1 * | 3/2011 | Feng et al. ............ 707/E17.109 |
| 2011/0087534 | A1 * | 4/2011 | Strebinger et al. ............ 707/769 |
| 2012/0016860 | A1 * | 1/2012 | Jones ............................. 707/706 |
| 2012/0158637 | A1 * | 6/2012 | Kshetramade et al. ......... 706/50 |
| 2012/0284291 | A1 | 11/2012 | Brown et al. |
| 2012/0309424 | A1 * | 12/2012 | Xiao et al. .................. 455/456.3 |
| 2013/0142056 | A1 * | 6/2013 | Abplanalp et al. ............ 370/252 |

OTHER PUBLICATIONS

International Search Report & Written Opinion for PCT Patent Application No. PCT/US2014/016657, Mailed Date: Jun. 3, 2014, Filed Date: Feb. 17, 2014, 9 Pages.

(Continued)

*Primary Examiner* — Rehana Perveen
*Assistant Examiner* — Tiffany Thuy Bui
(74) *Attorney, Agent, or Firm* — Steve Wight; Sandy Swain; Micky Minhas

(57) ABSTRACT

A communication-powered searching system provides real-time personalized search assistance to a user by integrating search functionality with real-time communication. Upon submitting a query and receiving search results from the communication-powered searching system, the user may select a communication link included in the search results to activate communication with an entity associated with the communication link. The communication-powered searching system may then refine search results displayed to the user based on information exchanged between the user and the entity. The refinements may be made in real time or substantially in real time.

20 Claims, 8 Drawing Sheets

(56) References Cited

OTHER PUBLICATIONS

"Flapon—Topic-Based Social Networking/StartupWizz," retrieved at <<http://www.startupwizz.com/2011/04/flapon-topic-based-social-networking/>>, Apr. 18, 2011, 3 pages.

Goodwin, "Bing Introduces 3-Column Search Results with Snapshots Social Sidebar," retrieved at <<http://searchenginewatch.com/article/2173975/Bing-Introduces-3-Column-Search-Results-With-Snapshots-Social-Sidebar>>, May 10, 2012, 3 pages.

Greene, "Bing deepens Facebook integration connecting searchers with friends," retrieved at <<http://news.cnet.com/8301-10805_3-57431224-75/bing-deepens-facebook-integration-connecting-searchers-with-friends/>>, May 10, 2012, 3 pages.

Indvik, "Bing Gets Social Search Right With Quora Integration," retrieved at <<http://mashable.com/2012/08/22/bing-quora-integration/>>, Aug. 22, 2012, 1 page.

Pradeep, "Microsoft Bing Announces Klout Integration in Search Results," retrieved at <<http://microsoft-news.com/microsoft-bing-announces-klout-integration-in-search-results/>>, Sep. 27, 2012, 3 pages.

* cited by examiner

COMMUNICATION-POWERED SEARCH

BACKGROUND

Information search has become an important activity of people's daily lives. A person may search the Internet for a variety of information including, for example, the latest news, places of interest, entertainment, etc. However, given the ever-growing volume of information in the Internet, people find it increasingly more difficult to locate the particular information they desire. Although new search technologies have continuously been proposed and developed, these new search technologies rely heavily on processing and storage abilities of search engines and sometimes fall short of providing a user with the desired information. Furthermore, whether the user can successfully obtain information that he/she desires still depends heavily on his/her search skills, such as ability to describe information he/she desires using a few keywords. Even though the search engine may suggest a plurality of keywords as the user types in a query, these suggested keywords may fail to anticipate a search intention of the user.

Additionally, advertisers compete and bid against one another for prominent placement in search result pages in response to a particular keyword. After placing their advertisements on the search result pages, the advertisers will passively wait for users to click on their advertisements and read relevant web pages related to their products. Since the users may sometimes need to read most, if not all, of content on the web pages in order to determine whether they are interested in the products, most of the users simply ignore these advertisements, leading to a generally poor performance of this kind of advertising strategies.

SUMMARY

This summary introduces simplified concepts of a communication-powered search, which are further described below in the Detailed Description. This summary is not intended to identify essential features of the claimed subject matter, nor is it intended for use in determining a scope of the claimed subject matter.

This application describes example embodiments of a communication-powered search. In one embodiment, a search engine receives a search query from a client device of a user. Upon receiving the search query, the search engine returns a plurality of search results to the client device for display to the user. The plurality of search results include one or more information links that point to online information related to the search query. Additionally, the plurality of search results further includes one or more communication links that may be used to activate communication between the user and one or more entities upon selection by the user.

In an event that the user selects a particular communication link of the one or more communication links, the search engine may establish a communication connection to allow real-time communication between the user and an entity associated with that particular communication link. The search engine may enable the user to receive information relevant to the query through this communication. Additionally or alternatively, the search engine may analyze information exchanged between the user and the entity, and refine the search and/or search results based on the analyzed information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
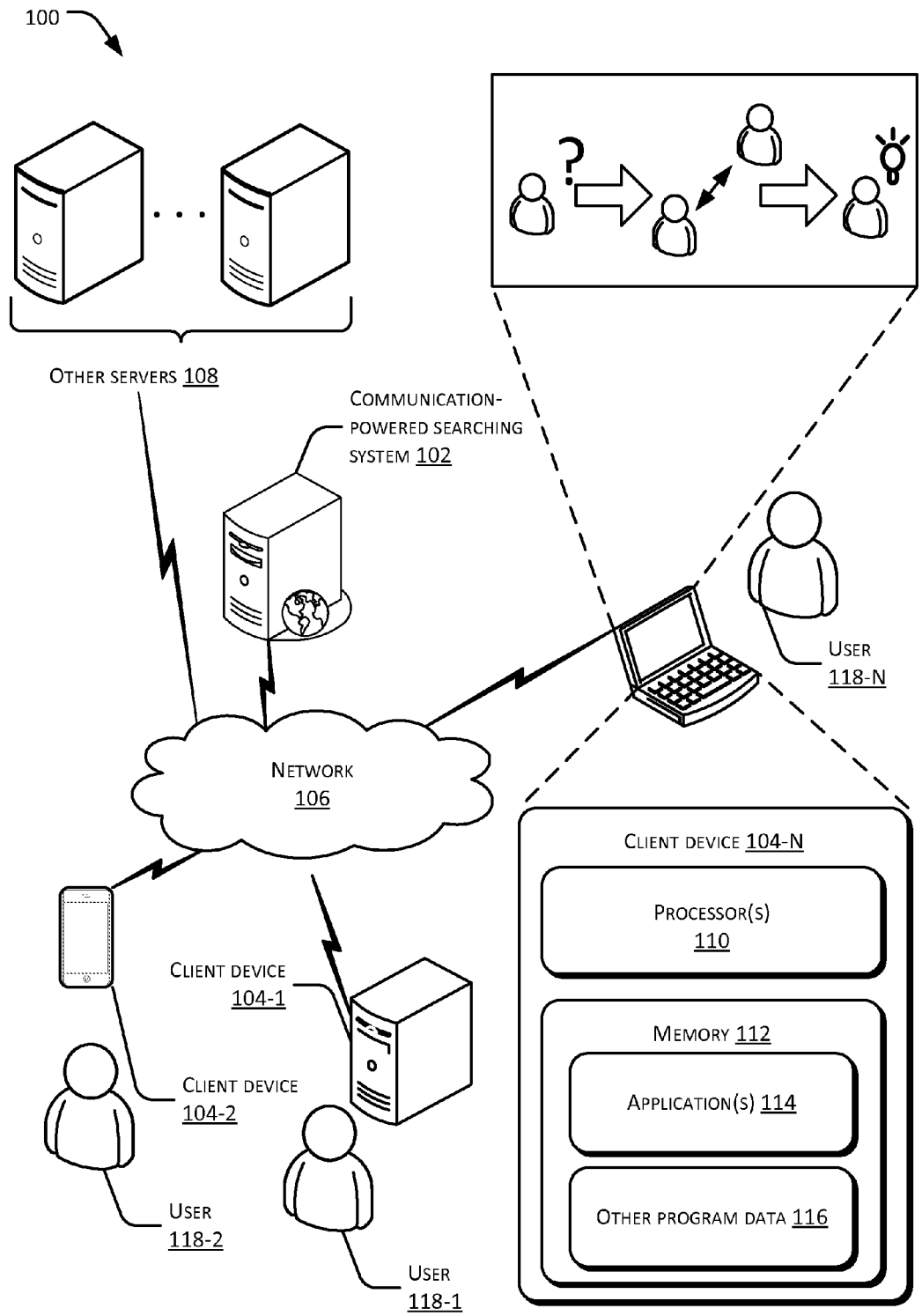
FIG. 1 illustrates an example environment including an example communication-powered searching system.

As noted above, existing search technologies find it increasingly more difficult to provide information that is desired by users due to the ever-growing volume of information in the Internet. This is particularly true when a user fails to provide a keyword that adequately describes information he/she desires. Moreover, existing advertising strategies passively present advertisements to the users on search result pages, in a hope that the users will read the advertisements. Even if a user is interested in a product promoted by an advertisement, the user may still refrain from spending the time required to view the advertisement and/or a web page pointed to by the advertisement link obtained in the search results.

This disclosure describes a communication-powered searching system, which enhances a search experience of a user by integrating search functionality with real-time communication. The communication-powered searching system acts as a platform or hub to help the user perform a query search and/or communicate with one or more experts or entities (e.g., other users or advertisers) in real time. Communication with the one or more entities may result in an improved search query or other search assistance helpful to locate information desired by the user.

In one embodiment, the described system may receive a query from a client device of a user. In response to receiving the query, the communication-powered searching system determines and returns search results that are relevant to the query. The search results may include, for example, one or more information links that point to online information related to the query. Additionally, the search results may include one or more communication links that, upon selection by the user, establish one or more communication connections or channels between the user and one or more entities. The one or more communication links may establish a real-time or instant communication that includes, but is not limited to, an instant messaging communication, a video communication, an audio communication, etc.

Additionally or alternatively, the one or more communication links may establish a connection or communication to a chatting room or chatting group that serves a similar or same intent, topic or interests of the user as determined from the query. The chatting room or chatting group may include one or more entities who share a similar or same interest or intent of the user. The user may join a chatting room or chatting group by selecting a communication link associated with this chatting room or chatting group to begin a chatting with one or more entities who have also joined the chatting room or chatting group.

Additionally or alternatively, in some embodiments, the one or more communication links may enable a deferred communication such as an email communication between the user and the one or more entities.

The communication-powered searching system may make use of the real-time communication between the user and an entity to provide query or search assistance to the user. For example, the communication-powered searching system may analyze information exchanged in the real-time communication and refine the search results for display to the user in real time or substantially in real time. Additionally or alternatively, the communication-powered searching system may enable sharing of a results page or an associated user interface of the user with the entity (upon receiving an approval from the user, for example), and allow the entity to manipulate information displayed in the results page or the user interface during the real-time communication. Examples of manipulation may include editing keyword(s) associated with the query or inputting new keyword(s), providing additional or alternative search results such as additional information links and/or communication links, providing additional or alternative online information related to the query, etc.

Additionally, the communication-powered searching system may further conflate identities (such as email accounts, social network accounts, etc.) of the user (if more than one identity exists), and make an identity of the user anonymous to the entity. The communication-powered searching system may enable the user to communicate with the entity anonymously without disclosing the identity of the user to the entity. Additionally or alternatively, the communication-powered searching system may also allow the entity to be anonymous to the user without providing or showing identification information of the entity to the user. The communication-powered searching system may achieve this anonymous communication by acting as a communication platform and providing a designated memory space (such as a chatting room) for communication and/or exchange of information between the user and the entity, for example. The information exchanged between the user and the entity may be sent to the designated space, from which the communication-powered searching system may forward the information to opposite parties. Furthermore, although identities of the user and/or the entity may be anonymous to the opposite parties, the communication-powered searching system may identify the user and the entity through use of temporary data (such as cookies) and/or account information of the user and the entity.

Additionally, in some embodiments, the communication-powered searching system may keep information of the user private or unknown to other entities unless or until the communication-powered searching system receives an authorization from the user to disclose some or all of the user information to the other entities. For example, the communication-powered searching system may not disclose interests of the user (as determined based on the query, for example) to other entities unless or until the user conducts communication with the other entities through the one or more communication links provided by the communication-powered searching system.

The described system enhances the search experience of a user by integrating search functionality with real-time communication. By facilitating real-time communication with one or more entities related to a query, the described system enables a user to receive personalized and/or real-time query response through feedback from and/or interaction with the one or more entities, perhaps in addition to search results returned by a search engine. The personalized and/or real-time query response may include, for example, keyword suggestions other than predefined keyword suggestions given by the search engine, additional or alternative online information or information links, etc. In an event that an entity associated with a communication link is an advertiser or a seller of a product that is of interest to the user, the described system may further enable the user to obtain desired information through the real-time communication without time-consuming use of information provided by the advertiser or the seller in the Internet.

In the examples described herein, the communication-powered searching system may receive a query, determine and return search results, establish a communication connection between a user and an entity, share and synchronize a user interface of the user with the entity, conflate identities of the user and/or the entity and make identities of the user and the entity anonymous to each other. However, in other embodiments, these functions may be performed by multiple separate systems or services. For example, in one embodiment, a search service may receive a query from a user and return search results to the user, while a communication service may establish a connection or channel for communication between the user and an entity. A sharing service may share and synchronize a user interface of the user with the entity, and an identification service may conflate various identities of the user and make an identity of the user anonymous to the entity.

Furthermore, although in the examples described herein the communication-powered searching system may be implemented at least in part as a server associated with a search engine, in other embodiments, the communication-powered searching system may be implemented as a service provided in a server over a network. Furthermore, in some embodiments, the communication-powered searching system may be one or more services provided by one or more servers in a network or in a cloud computing architecture.

This application describes multiple and varied implementations and embodiments of communication-powered searching. The following section describes an example environment that is suitable for practicing various implementations. Next, the application describes example systems, devices, and processes for implementing a communication-powered searching system.

Exemplary Environment

FIG. 1 illustrates an exemplary environment 100 that implements a communication-powered searching system 102. In one embodiment, the environment 100 may include a plurality of client devices 104-1, 104-2, ..., 104-N (which are collectively referred to device 104). The environment 100 may further include a network 106 and one or more servers 108. In this example, the communication-powered searching system 102 is a system separate from the client device 104 and the one or more servers 108. The device 102 and/or the communication-powered searching system 102 may communicate data with the one or more servers 108 via the network 106.

Although in this example, the communication-powered searching system 102 is described to be a system separate from the client device 104 and the one or more servers 108, in some embodiments, functions of the communication-powered searching system 102 may be included and distributed among the client device 104 and/or the one or more other servers 108. For example, the client device 104 may include part of the functions of the communication-powered searching system 102 while other functions of the communication-powered searching system 102 may be included in one or more other servers 108. Furthermore, in some embodiments, the communication-powered searching system 102 may be included in one or more third-party servers, e.g., other servers 108, which may or may not be a part of a cloud computing system or architecture. In some instances, the communication-powered searching system 102 may be part of a search engine or a supporting system for the search engine.

The client device 104 may be implemented as any of a variety of conventional computing devices. Some examples include a mainframe computer, a server, a notebook or portable computer, a handheld device, a netbook, an Internet appliance, a tablet or slate computer, a mobile device (e.g., a mobile phone, a personal digital assistant, a smart phone, etc.), a game console, a computing device or a combination of any of the preceding.

In one embodiment, the client device 104 includes one or more processors 110 coupled to memory 112. The memory 112 includes one or more applications or services 114 (e.g., a web browser application, a search application, etc.) and other program data 116. The client device 104 may be coupled to, associated with, and/or accessible to other devices, such as network servers, routers, and/or the other servers 108.

The network 106 may be a wireless or a wired network, or a combination thereof. The network 106 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In one embodiment, the environment may further include one or more users 118-1, 118-2, . . . , 118-M (collectively referred to as user 118). In one instance, a user 118 may search information on the Internet using the application 114 (e.g., the search or browser application) on the client device 104. For example, the user 118 may visit Seattle and want to know points of interest within that city. The user 118 may submit 120 a query, e.g., "points of interest and Seattle", to the search application (or a web browser), which may send the query to the communication-powered searching system 102, which then returns search results to the search application for display to the user 118. The search results may include one or more communication links that enable the user 118 to communicate with experts or entities 122 that are familiar with information related to the query. In one instance, the experts or entities 122 may include other users 118-2, . . . , 118-M, one or more automated answering systems, one or more advertisers, one or more web administrators, etc. Upon notice of selection of one of the communication links by the user 118, the communication-powered searching system 102 may establish instant or real-time communication between the user 118 and an associated entity 122. The user 118 and the selected entity 122 may exchange 124 information related to the query of the user 118. In response to information exchanged in the communication, the communication-powered searching system 102 may refine the search results or other information displayed to the user 118. The communication-powered searching system 102 may then provide 126 new or additional search results to the user 118.

Figure 2:
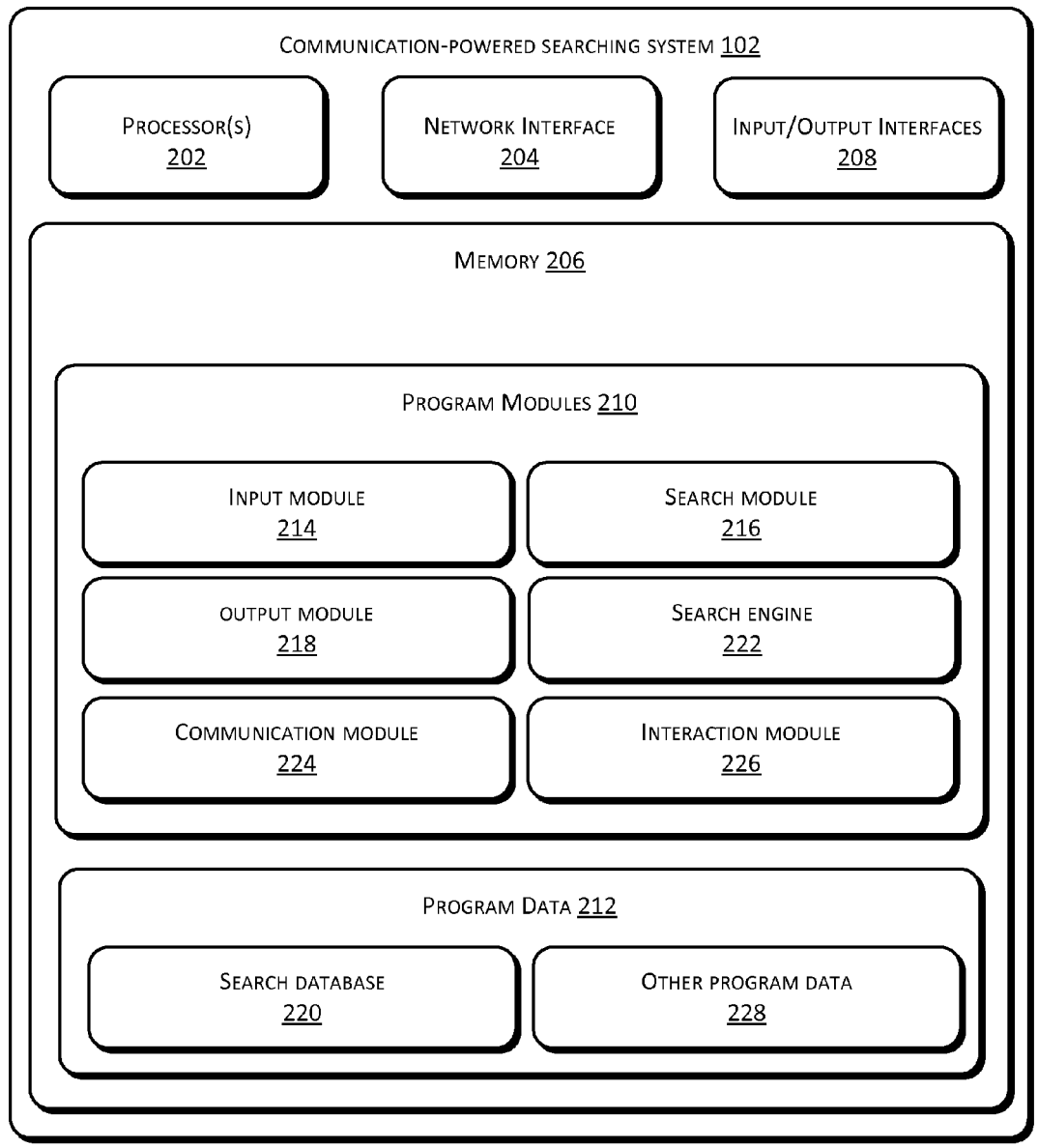
FIG. 2 illustrates the example communication-powered searching system of FIG. 1 in more detail.

FIG. 2 illustrates the communication-powered searching system 102 in more detail. In one embodiment, the communication-powered searching system 102 includes, but is not limited to, one or more processors 202, a network interface 204, memory 206, and an input/output interface 208. The processor(s) 202 may be configured to execute instructions received from the network interface 204, received from the input/output interface 208, and/or read from the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

In one embodiment, the communication-powered searching system 102 may include program modules 210 and program data 212. The program modules 210 may include an input module 214 configured to receive a query from the client device 104 of the user 118. The query may include one or more textual keywords and/or images that the user 118 uses to describe information he/she desires to find. In some embodiments, the input module 214 may further receive other information from the client device 104. The other information may include identification information of the user 118 which includes, for example, a user name or identity of a communication account including, for example, an email account (such as a Hotmail® account), a social network account (such as a Skype® account or a Facebook® account, etc.), an online shopping account (e.g., an Amazon® account, etc.), etc. In one embodiment, the client device 104 may send this other information to the input module 214 if or only if the client device 104 receives an instruction from the user 118 to send the other information to the communication-powered searching system 102.

Upon receiving the query and/or the other information from the client device 104, the input module 214 may transmit the query to a search module 216. The search module 216 determines and locates information related to the query, and returns search results to the client device 104 through an output module 218. In one embodiment, the search module 216 may obtain these search results from an internal search database 220. Additionally or alternatively, the search module 216 may obtain the search results from one or more external search databases. The one or more external search databases may be included in the one or more servers 108, for example. The internal and/or external search databases may store online information in a structural or tabular manner, and enable querying of the online information using keywords as indices, for example.

Additionally or alternatively, in some embodiments, the search module 216 may obtain the search results using an internal search engine 222 of the communication-powered searching system 102. Additionally or alternatively, the search module 216 may obtain the search results based on one or more external search engines included in the one or more servers 108, for example. The internal and/or external search engines may include search engines that perform searches based on one or more existing search technologies, including, for example, Bing®, Google®, Yahoo®, etc.

In one embodiment, the search results may include online information and/or information links that provide or point to the online information (such as textual, image, video and/or audio information) relevant to the query. Additionally or alternatively, the search results may include one or more communication links associated with one or more entities 122. In one embodiment, the search module 216 may determine and/or obtain the one or more entities 122 that are relevant to the query (or capable of providing search assistance to the user 118) based on one or more payments or bids given by the one or more entities 122. For example, advertisers of products and/or services related to the query may compete to put respective communication links on result pages or prominent locations of the results pages by placing bids or payments for the one or more keywords submitted in the query of the user 118. The search module 216 may select a number of advertisers as potential candidates of the one or more entities 122 based on one or more existing bid selection strategies such as first-N highest bid wins, where N is an integer greater than or equal to one, for example.

Additionally or alternatively, the search module 216 may determine and/or obtain the one or more entities 122 related to the query (or capable of providing search assistance to the user 118) based on searching and analyzing online information associated with other users. For example, the search module 216 may search and analyze information posted by the other users on one or more social networks, forums, blogs, reviews, etc., and determine whether any piece of the posted information is relevant to the query of the user 118. In response to determining that a certain piece of posted information is relevant to the query, the search module 216 may include a user who posts that piece of posted information as a potential candidate of the one or more entities 122. In one embodiment, the search module 216 may select the user who posts that piece of posted information as a potential candidate of the one or more entities 122 if or only if the search module 216 also locates or finds identification information (such as a user name or identity of an email account, a social network account, etc.). Additionally or alternatively, the search module 216 may select the user who posts that piece of posted information as a potential candidate of the one or more entities 122 if or only if the user who posts that piece of posted information is willing and/or available to provide query or search assistance for the user 118.

In one embodiment, an entity 122 of the one or more entities 122 may have a plurality of identities, such as having a plurality or combination of email accounts, social network accounts and/or other user accounts. In this instance, the search module 216 may conflate the plurality of identities of the entity 122 and select a specific identity for the entity 122. For example, the search module 216 may select an identity for the entity 122 based on a preference or selection of the entity 122. Additionally or alternatively, the search module 216 may select an identity for the entity 122 based on which of the plurality of identities of the entity 122 is associated with posted information that is most relevant to the query. Although the search module 216 receives and/or conflates one or more identities of an entity 122, the search module 216 may not include this identification of the entity 122 in the search results in some instances. Additionally or alternatively, the search module 216 may create an anonymous identity for the entity 122 that is identifiable by the communication-powered searching system 102 and unidentifiable by the user 118. The search module 216 may include this anonymous identity for the entity 122 in the search results to represent the entity 122.

Upon determining and/or obtaining the one or more entities 122 related to the query, the search module 216 may rank the communication links of the one or more entities 122 and return an ordering of the ranked communication links to the client device 104 for display to the user 118. In one embodiment, the search module 216 may rank the communication links of the one or more entities 122 based on availability of the one or more entities 122. For example, the search module 216 may give a higher rank for an entity 122 that is currently available and/or online than an entity 122 that is currently unavailable and/or offline.

Additionally or alternatively, the search module 216 may rank the communication links of the one or more entities 122 based on relevancy associated with the one or more entities 122. By way of example and not limitation, the search module 216 may give a higher rank to an entity 122 whose posted information is more relevant than an entity 122 whose posted information is less relevant compared thereto. Additionally or alternatively, depending on a type or nature of the query, the search module 216 may determine a degree of relevancy differently for an entity 122. For example, given a location-related query (such as "Which restaurant is the best in Seattle?"), the search module 216 may determine that an entity 122 located in a region closer to a location indicated in the query is more relevant than an entity 122 who is located farther away. Similarly, an entity 122 located closer to the user 118 (e.g., as determined by account information or other sources) may be selected over an entity 122 that is more remotely located. Alternatively, given a product-related query (such as "Windows® phone"), the search module 216 may determine that an entity 122 that has purchased a Windows® phone is more relevant than an entity 122 that has not purchased a Windows® phone, even though the latter entity 122 is located closer to the former entity 122, for example.

Additionally or alternatively, the search module 216 may rank the communication links of the one or more entities 122 based on feedback rankings associated with the one or more entities 122. For example, the search module 216 may give a higher rank for an entity 122 that has a higher feedback ranking than an entity 122 that has a lower feedback ranking. In one embodiment, the feedback ranking of the entity 122 is related or restricted to feedback (rankings) given by one or more users for query or search assistance provided by the entity 122.

Additionally or alternatively, the search module 216 may rank the communication links of the one or more entities 122 based on one or more bids or payments submitted by the one or more entities 122. As described in one of the above examples, bidders (such as advertisers, for example) may submit bids (or payments) to compete for prominent positions to place their communication links in a results page. The search module 216 may therefore rank the one or more entities 122 based on respective bids. In some embodiments, the search module 216 may rank at least a predetermined number of bidders in the first N ranking positions, where N is an integer greater than one.

As described in the foregoing examples, the search module 216 may rank the communication links of the one or more entities 122 based on a variety of factors. In some embodiments, the search module 216 may rank the communication links of the one or more entities 122 based on a combination of two or more above factors of equal weights. In another embodiment, the search module 216 may rank the communication links of the one or more entities 122 based on a combination of two or more above factors of different weights. The search module 216 may weight different factors with equal or different weights based on, for example, a default setting predetermined by the communication-powered searching system 102 or a user-defined setting predefined by the user 118.

Upon determining and/or ranking the one or more entities 122, the search module 216 may include the one or more communication links associated with the one or more entities 122 in the search results. In some embodiments, the search module 216 may further provide additional information that is associated with the one or more entities 122 in the search results. The additional information may include, for example, identification information (such as user names or identities, etc., summaries or extracts of posted information that are relevant to the query, etc.). Additionally or alternatively, in some instances, the additional information may include other information (such as contact information, location information, etc.) of the one or more entities 122. The output module 218 may return the search results (including the one or more information links, the one or more communication links and/or the additional information, etc.) to the client device 104 for display to the user 118.

Upon returning the search results to the user 118, the communication-powered searching system 102 waits for a further input from the client device 104. For example, after viewing a results page including the search results, the user 118 may modify the one or more keywords of the query. Alternatively, the user 118 may select an information link to view online information that is provided or pointed to by this information link. In one instance, the user 118 may note an entity 122 (e.g., user 118-2) with whom the user 118 wants to communicate to obtain query or search assistance. The user 118 may select this entity 122 based on, for example, information (such as a summary of posted information, etc.) displayed with the entity 122. In this instance, the user 118 may select a communication link associated with the entity 122 by clicking the communication link, for example. The client device 104 may then send information about this selection to the communication-powered searching system 102.

In response to receiving the selection of a communication link by the user 118, a communication module 224 of the communication-powered searching system 102 may send a request to a client device of the selected entity 122, checking whether the selected entity 122 is available and/or willing to provide search or query assistance to the user 118. In one instance, the selected entity 122 may decline to provide search assistance to the user 118 and send a denial reply to the communication-powered searching system 102. In this instance, the communication-powered searching system 102 may notify the user 118 that the selected entity 122 has declined to provide search assistance to him/her and either ask the user 118 to select another entity 122 or wait for another input from the user 118. In some instances, the selected entity 122 accepts the request and sends a reply of acceptance to the communication-powered searching system 102.

In response to receiving the acceptance from the selected entity 122, the communication module 224 may optionally determine whether identification and/or account login information has been received from the client device 104 of the user 118. If the identification and/or account login information has not been received from the client device 104, the communication module 224 may send a request to the client device 104 for obtaining the identification and/or account login information of the user 118 from the client device 104. Alternatively, if the identification and/or account login information has not been received from the client device 104, the communication module 224 may infer that the user 118 wants to communicate with the entity 122 anonymously without disclosing identification information to the entity 122.

In one embodiment, if the identification and/or account login information of the user 118 is received from the client device 104, the communication module 224 may set up a communication connection with an identity of the user 118 being shown to the selected entity 122. In an event that the identification and/or account login information of the user 118 includes information of a plurality of user accounts (such as email accounts, social network accounts, etc.) of the user 118, the communication module 224 may conflate the plurality of user accounts of the user 118. The communication module 224 may then select a particular user account (or a particular identity or user name) of the user 118 to represent the user 118 for communication with the selected entity 122. The communication module 224 may select the particular user account (or the particular identity or user name) based on a preference and/or an instruction of the user 118. Additionally or alternatively, the communication module 224 may select a particular user account (or a particular identity or user name) if that particular user account is currently signed in by the user 118 at the client device 104.

In some embodiments, the communication module 224 may receive an instruction from the user 118 through the output module 218, requesting anonymous communication with the selected entity 122. In response to receiving the instruction, the communication module 224 may activate or establish an anonymous communication between the user 118 and the selected entity 122. Additionally or alternatively, the communication module 224 may enable the user 118 to communicate anonymously with the entity 122 regardless of whether identification and/or account login information of the user 118 was provided by the user 118.

In some embodiments, the communication module 224 may further determine a type of communication to be activated or established between the user 118 and the entity 122 of the selected communication link. Examples of types of communication include an instant or real-time communication including an instant messaging communication, a video communication, an audio communication, etc. Additionally or alternatively, the type of communication may include a deferred communication, such as an email communication, etc.

Additionally or alternatively, the type of communication may include a chatting room or chatting group involving one or more other users or entities. The chatting room or chatting group may serve a similar or same intent, topic and/or interest of the user 122 which may be determined based on the query. The chatting room or chatting group may include one or more other entities who have also joined the chatting room or chatting group to enable a group chatting with the user 122.

In one embodiment, the communication module 224 may determine or select which type of communication to be activated or established based on, for example, a preference of the user 118 received from the client device 104. Additionally or alternatively, the communication module 224 may determine or select which type of communication to be activated or established based on bandwidth of communication available or allowable for the client device 104 of the user 118. Additionally or alternatively, the communication module 224 may determine or select which type of communication to be activated or established based on a common type of communication that is acceptable or allowable by both the user 118 and the selected entity 122.

Additionally or alternatively, the communication module 224 may determine or select which type of communication to activate or establish by determining one or more communication preferences of the user 118 and one or more communication preferences of the selected entity 122. The communication module 224 may then match the one or more communication preferences of the user 118 with the one or more communication preferences of the selected entity 122. The match may determine a communication preference allowed by both the user 118 and the selected entity 122, and set the type of communication to be activated or established based on the matched communication preference.

Additionally or alternatively, the communication module 224 may determine or select which type of communication to activate or establish based on a ranking of a plurality of types of communication defined in a communication preference associated with the user 118 and/or the selected entity 122. The communication module 224 may determine or select a type of communication that is most affordable or allowed by current bandwidth of a network (e.g., the network 106) between the user 118 and the selected entity 122.

The foregoing embodiments describe determination of a type of communication to be activated or established based on information of the user 118 and/or from a perspective of the user 118. However, in some embodiments, the communication module 224 may additionally or alternatively perform such determination based on information of the selected entity 122 and/or a perspective of the selected entity 122. The communication module 224 may perform such determination in the context of the selected entity 122 as described in the foregoing embodiments in the context of the user 118.

Upon determining a type of communication to be established between the user 118 and the selected entity 122, the communication module 224 may activate or establish a communication connection to enable communication between the user 118 and the selected entity 122. In one embodiment, if the user 118 and the selected entity 122 currently employ or sign in user accounts of a same communication system such as MSN Messenger®, for example, the communication module 224 may establish a communication connection using the communication system employed by the user 118 and the selected entity 122. For example, the communication module 224 may send a request or instruction to the client device 104 of the user 118 and the client device of the selected entity 122 to open respective communication systems for establishing a communication connection between the user 118 and the selected entity 122.

In some embodiments, the communication module 224 may enable the communication-powered searching system 102 to perform as a platform or hub, and allow exchange of information between the user 118 and the selected entity 122. For example, the communication module 224 may separately establish a communication connection between the client device 104 of the user 118 and the communication-powered searching system 102 and a communication connection between the communication-powered searching system 102 and the client device of the selected entity 122. Information (such as text, video, audio, image, etc.) exchanged between the client devices of the user 118 and the selected entity 122 is routed to each other through the communication-powered searching system 102. In some embodiments, the communication module 224 may perform this operation regardless of whether the user 118 and the selected entity 122 currently employ or sign in user accounts of a same communication system (e.g., MSN Messenger®) or different communication systems (e.g., Skype® for the user 118 and MSN Messenger® for the selected entity 122, etc.).

Additionally or alternatively, the communication module 224 may allow the user 118 and/or the selected entity 122 to conduct communication anonymously (without disclosing identification information to the opposite party) or non-anonymously (i.e., identifiably). For example, depending on whether an explicit or implicit request or instruction is received from the user 118 and/or the selected entity 122, the communication module 224 may establish an anonymous, semi-anonymous or non-anonymous communication. For instance, if the user 118 or the selected entity 122 has not signed in to a user account (or does not provide account login information to the communication module 224), the communication module 224 may recognize that the user 118 or the selected entity 122 implicitly wants to conduct the communication anonymously. Therefore, the communication module 224 may establish a semi-anonymous (if only one of the user 118 and the selected entity 122 has provided this implicit instruction) or anonymous (if both have provided this implicit instruction) communication for the user 118 and the selected entity 122.

In an alternative embodiment, if both the user 118 and the selected entity 122 currently sign into respective user accounts, the communication module 224 may treat this as an implicit instruction to conduct a non-anonymous (i.e., identifiable or explicit) communication. Additionally or alternatively, the communication module 224 may receive an explicit instruction from the user 118 and/or the selected entity 122 indicating whether he/she wants to conduct communication anonymously or non-anonymously.

Additionally, in some embodiments, the communication module 224 may keep information of the user 118 private or unknown to other entities 122 unless or until the communication module 224 receives an authorization from the user 118 to disclose some or all of the user information to the other entities 122. For example, the communication module 224 may not disclose interests of the user 118 (as determined based on the query, for example) to other entities 122 unless or until the user 118 conducts communication with the other entities 122 through the one or more communication links provided by the communication-powered searching system.

Upon establishing the communication connection for the user 118 and the selected entity 122, the communication module 224 may send information associated with this communication to the client device 104 of the user 118 and the client device of the selected entity 122. In an event that an authorization has been received from the user 118 to share a user interface displayed in the client device 104 with the client device of the selected entity 122, an interaction module 226 may further share the user interface with the client device of the selected entity 122. The user interface to be shared may include, for example, a search result page displayed in the client device 104 of the user 118.

During the communication or interaction between the user 118 and the selected entity 122, the input module 214 may obtain information exchanged between the user 118 and the selected entity 122, and forward the obtained information to the interaction module 226. The interaction module 226 may analyze the obtained information and refine the search results displayed to the user 118 based on the analyzed information. In one embodiment, the interaction module 226 may extract one or more additional keywords from the obtained information and use the one or more additional keywords to retrieve additional or alternative search results for the user 118. Additionally or alternatively, the interaction module 226 may determine a context of the obtained information and refine the search query and/or search results based on this determined context. In some instances, the determined context may broaden or narrow the search query and/or the search results.

Additionally or alternatively, the interaction module 226 may allow the selected entity 122 to modify the query or provide a new query. In one embodiment, the interaction module 226 may enable the selected entity 122 to modify the query or provide a new query through the shared user interface displayed in the client device of the selected entity 122 if the selected entity 122 is authorized to share the user interface of the client device 104 of the user 118.

Alternatively, the selected entity 122 may not be authorized by the user 118 to share the user interface of the client device 104. In this event, the interaction module 226 may provide a query input interface to the client device of the selected entity 122, and allow the selected entity 122 to modify the original query of the user 118 and/or provide a new query for the user 118. In some embodiments, prior to providing the query input interface to the selected entity 122, the interaction module 226 may have obtained an authorization or instruction from the user 118 to allow the selected entity 122 to modify the query or provide a new query for the user 118.

Regardless of whether the selected entity 122 modifies the query of the user 118 or provides a new query through the shared user interface or the query input interface, the input module 214 may send the modified query or new query to the search module 216 which then retrieves new search results based on the modified query or new query. The search module 216 may send the new search results to the client device 104 for display to the user 118 through the output module 218 in real time or substantially in real time. In some embodiments, the search module 216 may further send the new search results to the client device of the selected entity 122. The new search results may be presented in the client device 104 of the user 118 (and the client device of the selected entity 122) in addition to or in alternative to the previously presented search results obtained based on the original or previous query.

Additionally or alternatively, the interaction module 226 may enable the selected entity 122 to send additional or alternative search results directly to the client device 104 for display to the user 118. For example, the interaction module 226 may enable the selected entity 122 to add search results to the shared user interface, which are then synchronized in the user interface displayed in the client device 104 of the user 118 in real time or substantially in real time. Additionally or alternatively, the interaction module 226 may allow the selected entity 122 to add search results into a window or dialog displayed in his/her client device in association with the communication, and update the search results displayed in the client device 104 of the user 118 based on the added search results in the window or dialog.

Additionally or alternatively, the interaction module 226 may enable the selected entity 122 to manipulate the search results and/or information displayed in the client device 104 of the user 118 through the shared user interface. For example, the interaction module 226 may enable the selected entity 122 to select an information link to open a web page associated with the information link, move around or re-rank one or more of the search results, select or highlight text displayed in the shared user interface, etc. The interaction module 226 may then synchronize information displayed in the client device 104 with the updated information displayed in the shared user interface of the client device of the selected entity 122 accordingly in real time or substantially in real time.

In one embodiment, the interaction module 226 may allow further interactions (e.g., one or more of the above interactions) between the user 118 and the selected entity 122 until the user 118 and/or the selected entity 122 decides to terminate the communication.

Additional Implementations

In some embodiments, the communication-powered searching system 102 may further include other program data 228 to store the information exchanged between the user 118 and the selected entity 122. The communication-powered searching system 102 may employ this stored information to refine future search results retrieved based on the query. For example, if a search result (e.g., an information link), that was retrieved based on the query, is selected by the user 118 and/or the selected entity 122 during a session of communication, the selected search result may be given a predetermined additional score or a higher weight to its current ranking score. Therefore, the communication-powered searching system 102 or an associated search engine may place this search result in a higher-ranking position next time when the same or similar query is received.

Additionally or alternatively, the communication-powered searching system 102 may add or associate part or all of the information exchanged between the user 118 and the selected entity 122 to information used by the search module 216 to determine whether the selected entity 122 is relevant to a certain query. Additionally or alternatively, the communication-powered searching system 102 may add part or all of the exchanged information to a certain online location (such as a certain blog, review, etc.) associated with the selected entity 122 and/or the user 118 if an instruction is received from the selected entity 122 and/or the user 118, respectively.

Although the foregoing embodiments describe that the one or more communication links are separate from or unrelated to the displayed online information or the one or more information links, in some embodiments, some or all of the communication links may be associated with or related to the displayed online information or the information links. For example, a communication link may be associated with an information link and provide a communication means for the user 118 to communicate an operating person or sales person of a website pointed to by the information link. The communication-powered searching system 102 therefore opens up an opportunity for communication between a potential buyer (e.g., the user 118) and a potential seller (e.g., the selected entity 122) for exchanging information related to a product or service, and negotiating a deal instantly or in real time during a search.

Example User Interfaces

Figure 3:
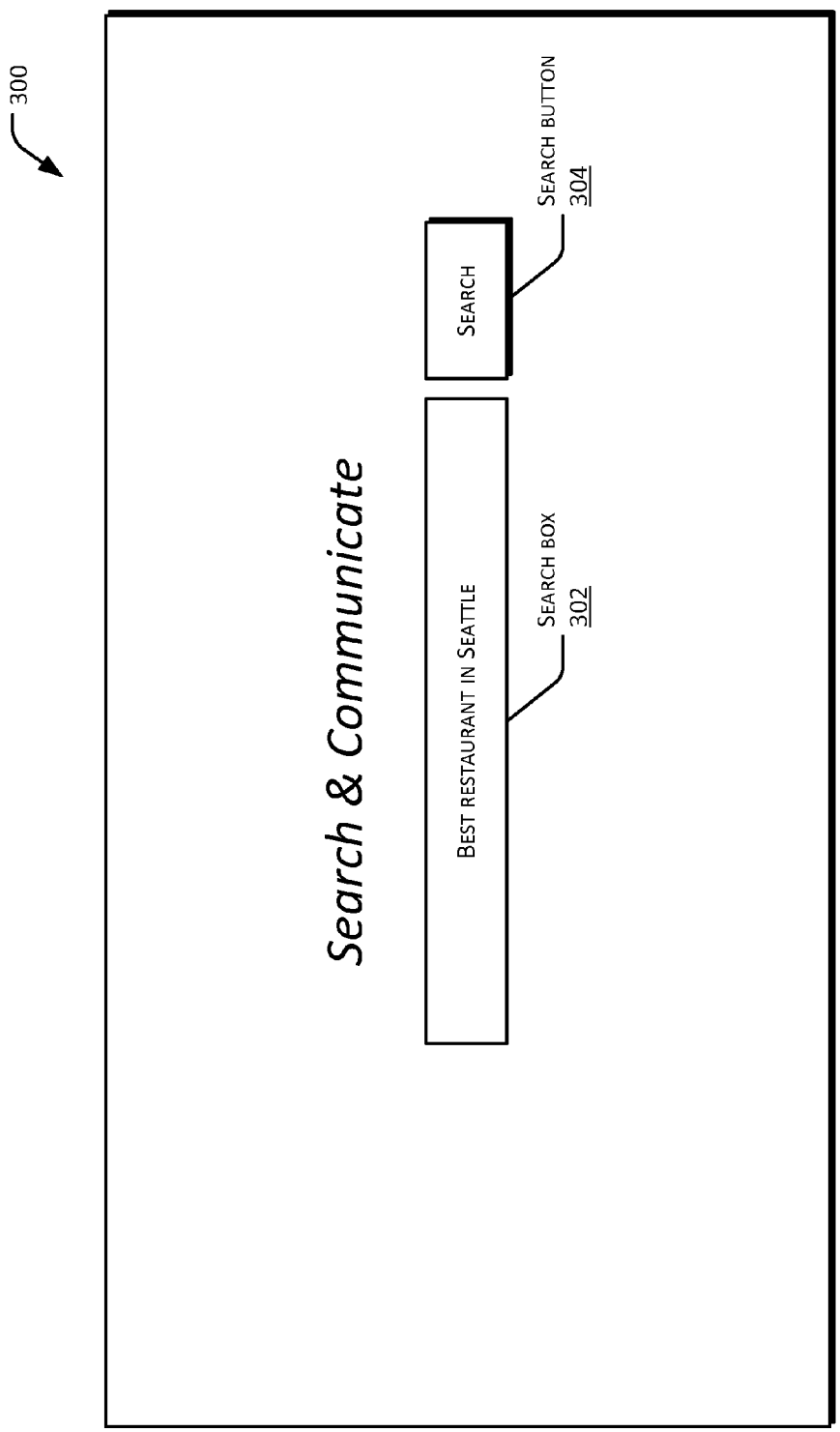
FIG. 3 illustrates an example user interface for inputting a search query.

FIG. 3 shows an example search interface 300 displayed in the client device 104 of the user 118. In FIG. 3, the example search interface 300 includes a search box 302 that allows the user 118 to input one or more keywords for a query. After the user 118 has entered the query (for example, "Best restaurant in Seattle"), the user 118 may submit the query to the communication-powered searching system 102 by clicking a search button 304.

Figure 4:
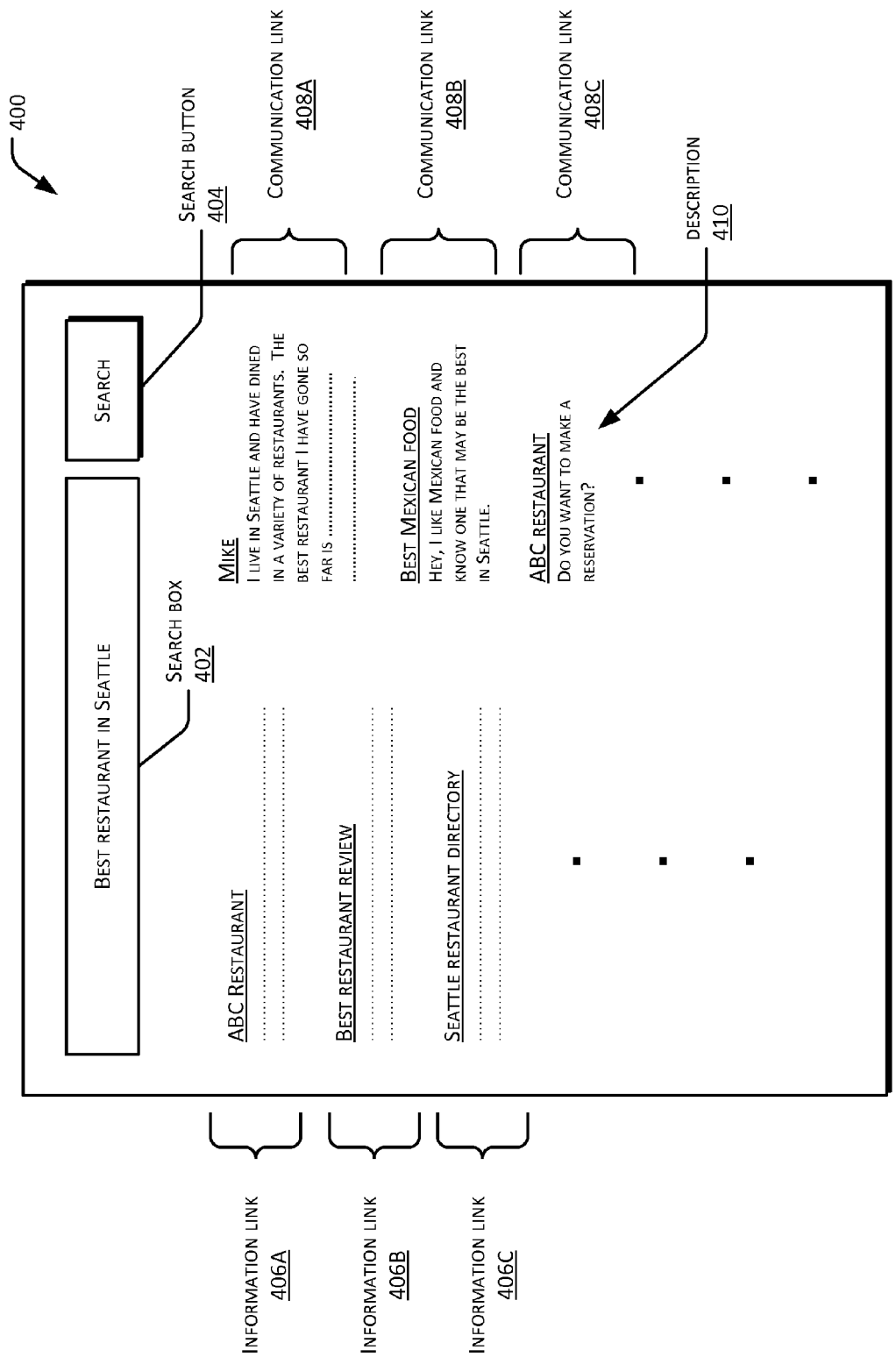
FIG. 4 illustrates an example user interface for displaying search results.

FIG. 4 shows an example result interface 400 displayed in the client device 104 after receiving search results from the communication-powered searching system 102. In FIG. 4, the example result interface 400 includes a search box 402, a search button 404, a plurality of information links 406A-406C, a plurality of communication links 408A-408C. In one instance as shown in FIG. 4, a brief description 410 may be displayed along with a certain communication link (e.g., the communication link 408C) of an entity 122. This brief description 410 provides additional information (e.g., in addition to its ranking position) to the user 118 to determine whether the associated entity 122 may be helpful in providing query or search assistance or other information. If the user 118 decides to select a particular entity 122 for query or search assistance, the user 118 may click on a communication link (e.g., the communication link 408A) associated with that particular entity 122 to request the communication-powered searching system 102 to establish a communication connection for the user 118.

Figure 5:
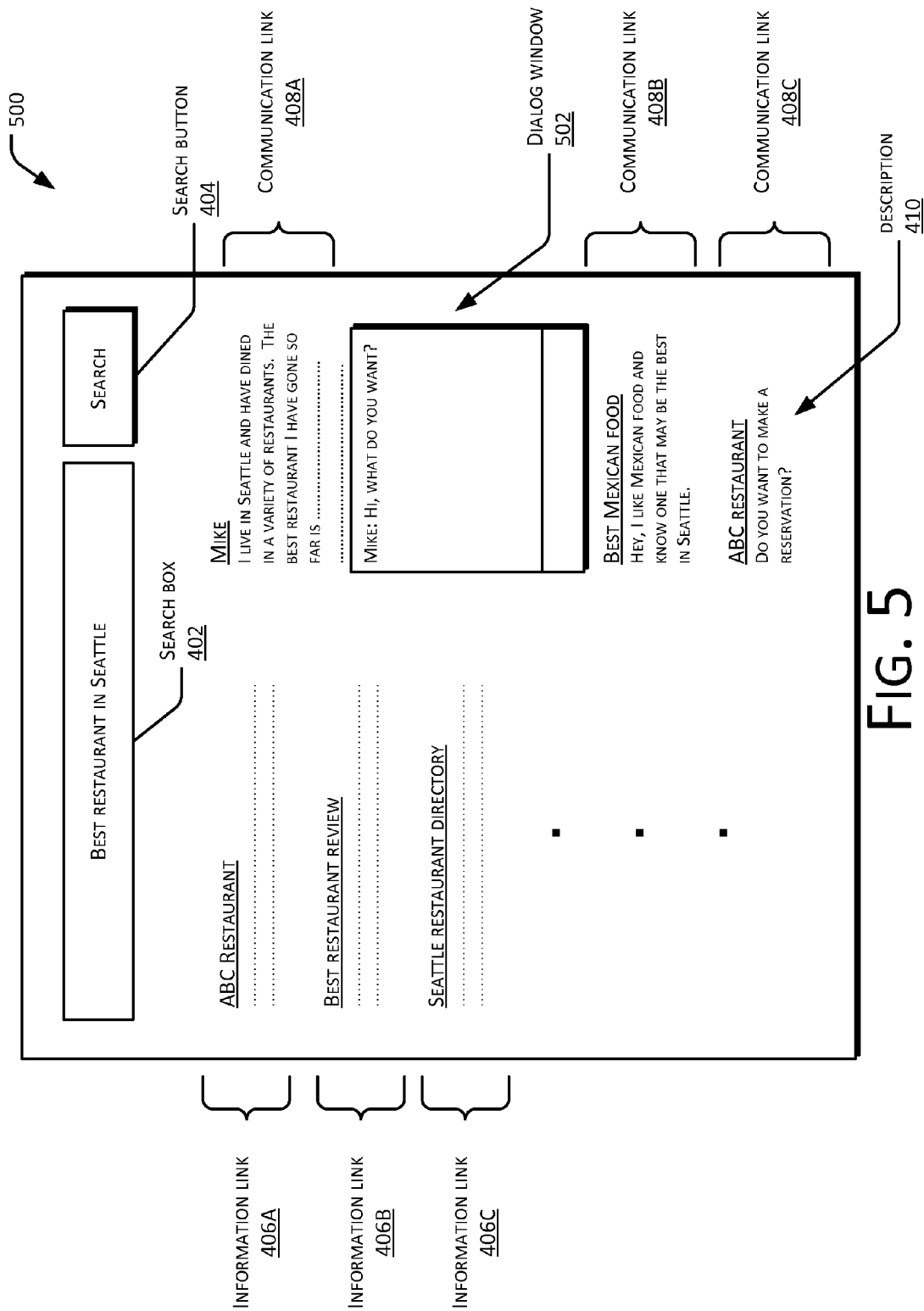
FIG. 5 illustrates an example user interface including communication interface.

FIG. 5 shows an example user interface 500 displayed in the client device 104 after a communication connection has been established between the user 118 and the entity 122. In this example, a dialog window 502 for instant messaging is created in place of the selected communication link shown on the result interface 400. In some embodiments, a separate window (not shown) may alternatively be created for communication between the user 118 and the selected entity 122. The user 118 may communicate with the selected entity 122 by inputting messages through the dialog 502.

Figure 6:
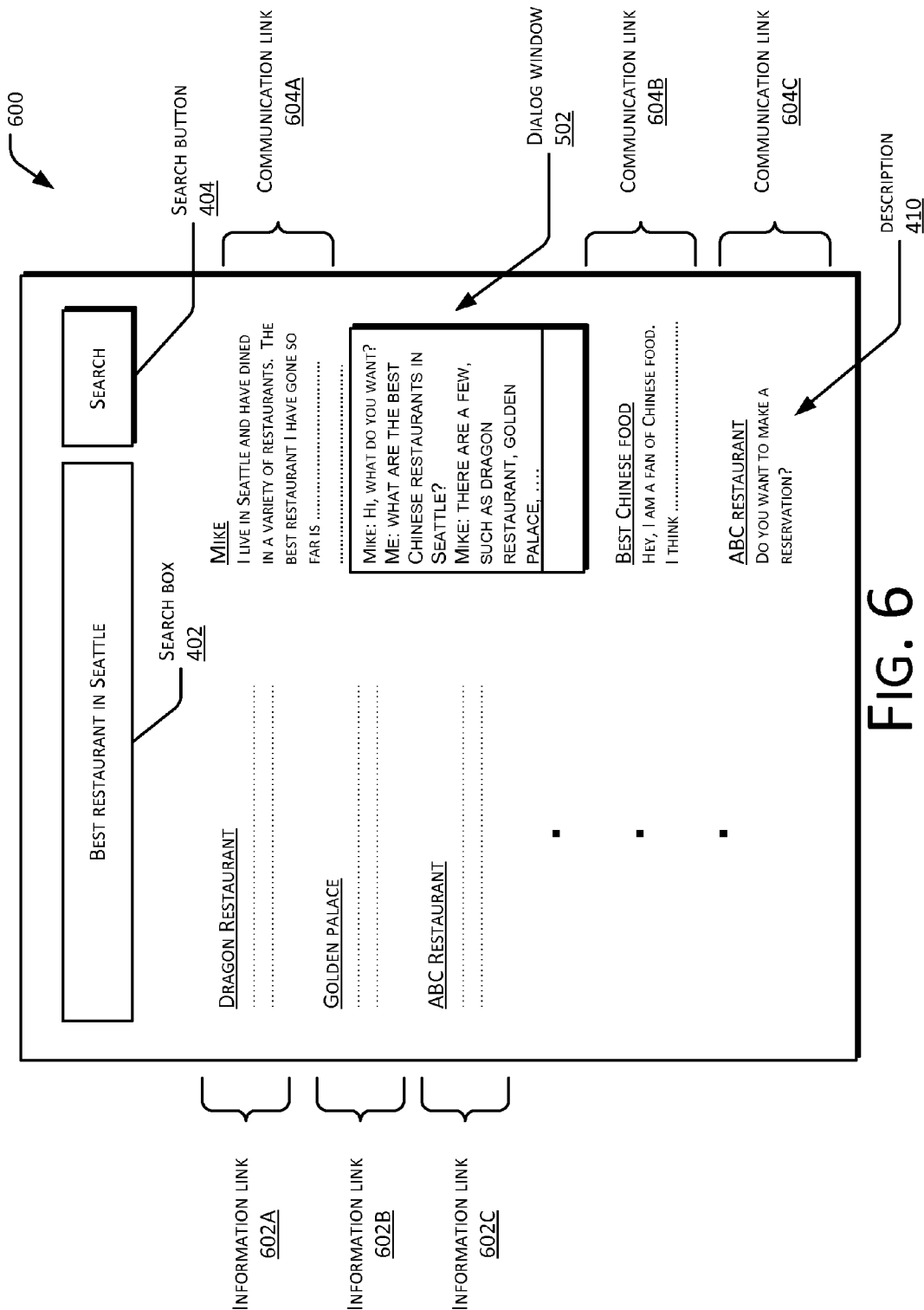
FIG. 6 illustrates an example user interface showing refined search results based on information exchanged in the communication interface.

FIG. 6 shows an example interaction interface 600 displayed in the client device 104 after the search results are refined based on information exchanged between the user 118 and the selected entity 122. As the user 118 communicates with the selected entity 122, the communication-powered searching system 102 may refine the search query (i.e., keyword(s), term(s), for example) and/or the corresponding search results based on the exchanged information and provide new search results to be displayed by the client device 104 in real time or substantially in real time. In this example, the new search results are represented by information links 602A-602C and communication links 604A-604C, for example.

Figure 7:
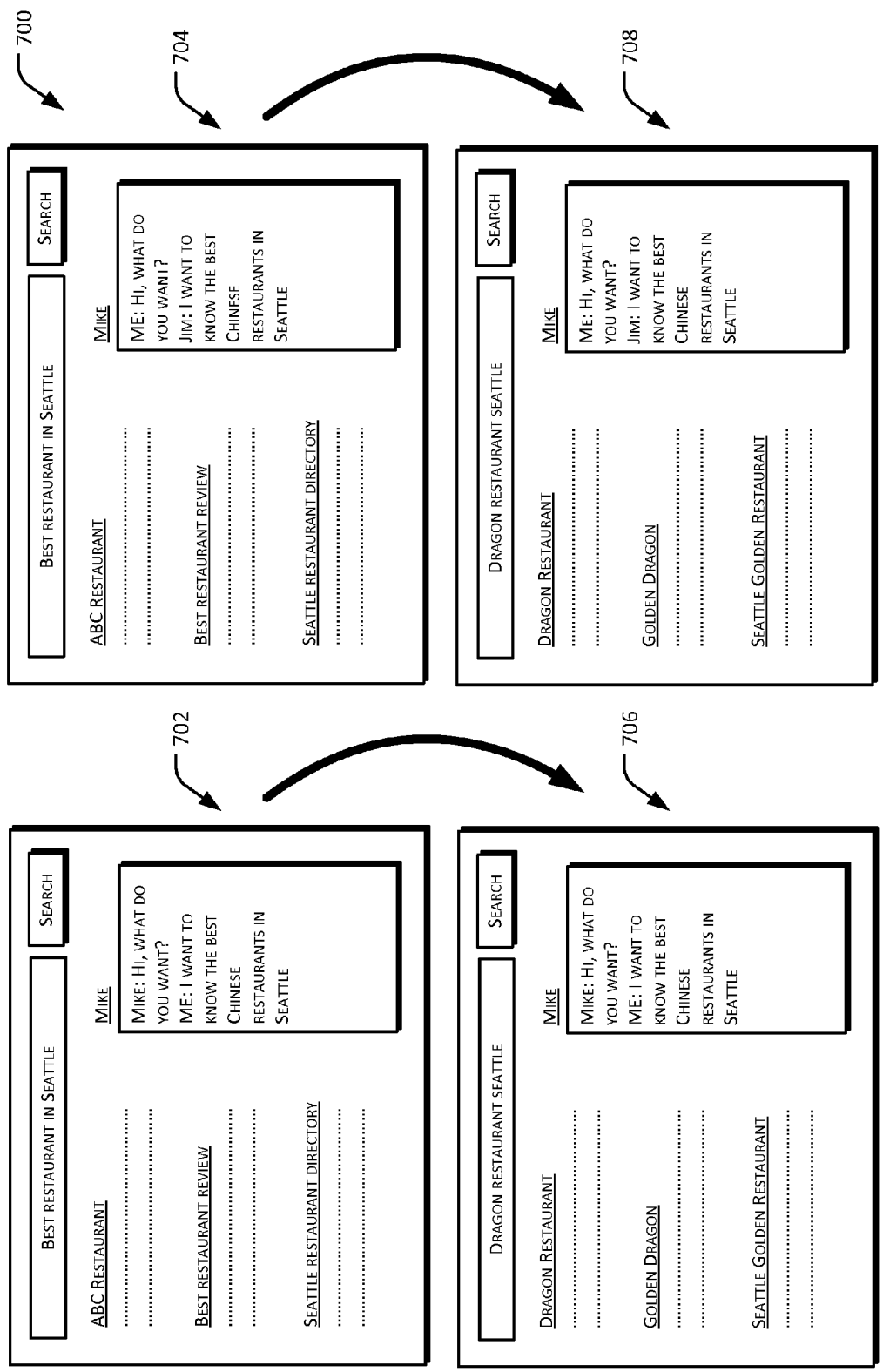
FIG. 7 illustrates an example of changes to a shared user interface during operation.

FIG. 7 shows a scenario 700 in which the user 118 has authorized the communication-powered searching system 102 to share a user interface of the client device 104 with the client device of the selected entity 122. The user interface 702 represents an example user interface displayed in the client device 104 of the user 118 while the user interface 704 represents an example user interface displayed in the client device of the selected entity 122. As the selected entity 122 manipulates information on the user interface 704 (e.g., modifying the query, etc.), the user interface 702 is synchronized to reflect such manipulation of the selected entity 122 as exemplified by the user interfaces 706 and 708. For example, the user interfaces 706 and 708 have been updated to reflect that the communication between user and entity 122 resulted in a new search query and associated new search results. In particular, the communication included a discussion of "Chinese restaurants," which resulted in addition of these terms to the search query. Accordingly, the search results were also updated.

Exemplary Methods

Figure 8:
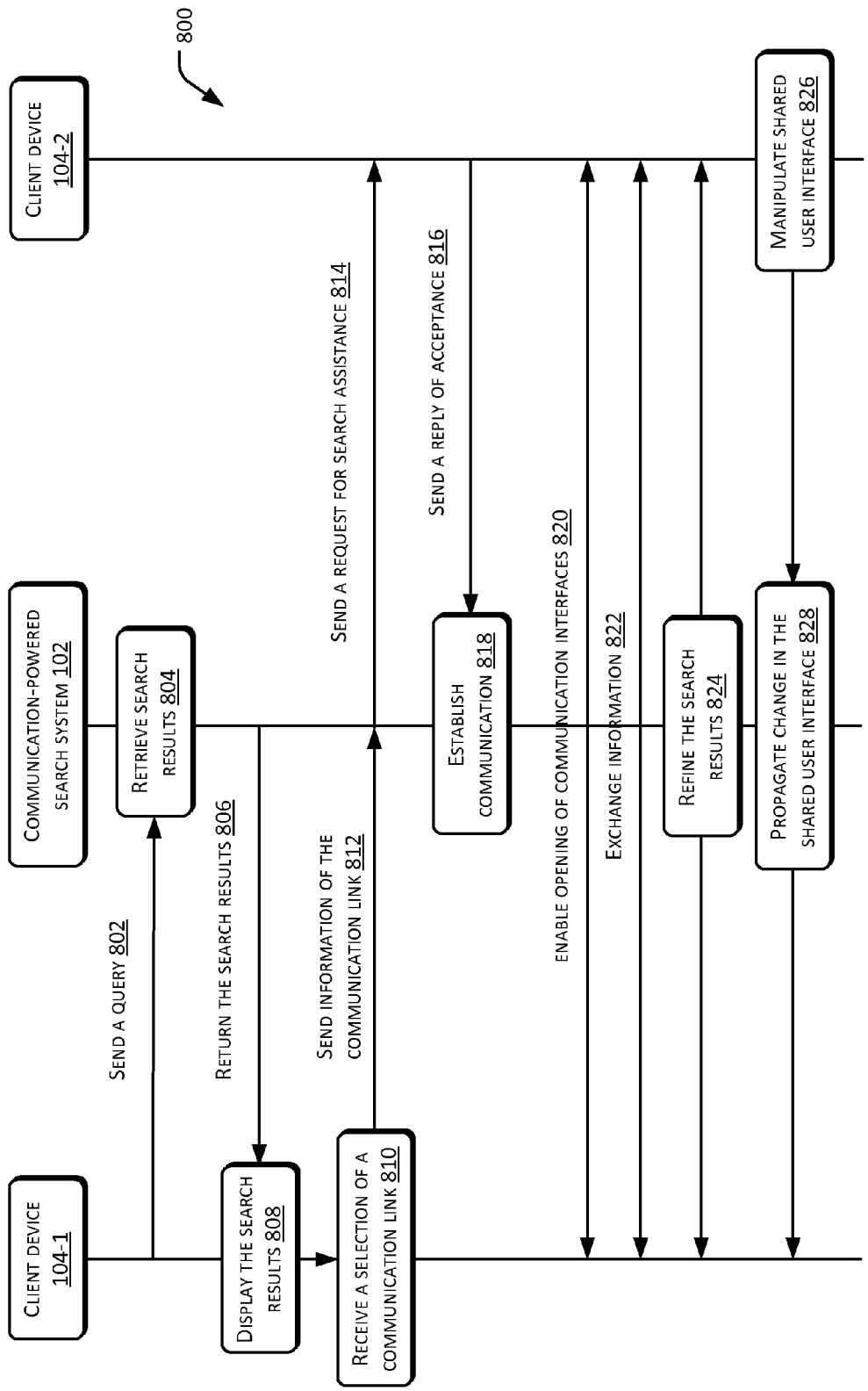
FIG. 8 illustrates an example method by which communication-powered search may be implemented.

FIG. 8 is a flow chart depicting an example method 800 of communication-powered searching. The method of FIG. 8 may, but need not, be implemented in the environment of FIG. 1 and using the system of FIG. 2. For ease of explanation, method 800 is described with reference to FIGS. 1 and 2. However, the method 800 may alternatively be implemented in other environments and/or using other systems.

Method 800 is described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The exemplary method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 8, at operation 802, the user 118 submits a query using the application 114 of the client device 104. The application 114 may include a search application or a web browser, and the query may include one or more keywords.

At operation 804, the communication-powered searching system 102 receives the query and retrieves search results related to the query for the user 118. For example, the search results may be retrieved from a search engine, other information processing system or the search database of the communication-powered searching system 102, etc. The search results may include one or more information links and one or more communication links. In one embodiment, a communication link may be related to, or associated with, an information link. In some embodiments, the one or more communication links may be separate from the one or more information links.

At operation 806, the communication-powered searching system 102 returns the search results to the client device 104 for display to the user 118.

At operation 808, upon receiving the search results, the client device 104 displays the search results in a user interface (such as a result page of the application 114).

At operation 810, the client device 104 receives a selection of a particular communication link from the user 118. The particular communication link may be associated with an entity 122 (e.g., user 118-2). The entity 122 may include, for example, an advertiser of an advertisement (e.g., a product advertisement, etc.), a web administrator of a website associated with an information link, another user who is available for query or search assistance.

At operation 812, upon receiving the selection of the particular communication link, the client device 104 sends information associated with this particular communication link to the communication-powered searching system 102. The information of this particular communication link may include an identifier of the communication link that is previously provided by the communication-powered searching system 102 when the search results are received.

At operation 814, the communication-powered searching system 102 sends a request to a client device (e.g., client device 104-M when the selected entity 122 corresponds to the user 118-M, for example) of the selected entity 122, requesting communication with the user 118 for query assistance.

At operation 816, the selected entity 122 sends a reply to the communication-powered searching system 102 through his/her client device, indicating an acceptance of the communication with the user 118. In some alternative embodiments, the selected entity 122 may decline to offer search or query assistance to the user 118, and may therefore reply of rejection or simply ignore the request to allow a time-off (which may be set by the communication-powered searching system 102 to avoid unlimited waiting). In this case, the communication-powered search system 102 may send a notification to the user 118, indicating that the selected entity 122 is unavailable or unwilling to provide search assistance and waiting for a new input or instruction from the user 118.

At operation 818, upon receiving the acceptance from the selected entity 122, the communication-powered searching system 102 establishes or activates a communication connection or channel based on the information of the selected communication link.

At operation 820, upon establishing the communication connection or channel, the communication-powered searching system 102 may enable opening of a communication interfaces (such as new dialog windows in FIGS. 5 and 6, for example) in the client device 104 of the user 118 and the client device of the selected entity 122. In some embodiments, the communication-powered searching system 102 may further share a user interface displayed in the client device 104 of the user 118 with the client device of the selected entity 122 if an authorization or permission has been received from the user 118.

At operation 822, the user 118 may input information to describe what he/she wants to find or what question he/she has through the communication channel. The selected entity 122 may exchange information with the user 118 through the communication channel.

At operation 824, the communication-powered searching system 102 may refine the search query and associated search results based on the information exchanged between the user 118 and the selected entity 122. For example, the communication-powered searching system 102 may send a new search with a new query (generated based on the exchanged information and/or the original query, etc.) to the search engine or the search database 220 to retrieve new search results. The communication-powered searching system 102 may send the new search results to the client device 104 of the user 118 and the client device of the selected entity 122 in real time or substantially real time. In some embodiments, a frequency of refining the search results and sending new search results may be manually set by the user 118 and/or the selected entity 122.

At operation 826, the selected entity 122 and/or the user 118 may manipulate or change information displayed in the shared user interface. For example, the selected entity 122 may modify the query previously submitted by the user 118, and submit the modified query to the communication-powered searching system 102.

At operation 828, in response to detecting manipulation or change of the information displayed in the shared user interface by the selected entity 122 and/or the user 118, the communication-powered searching system 102 propagates or synchronizes the manipulation or change of the information to the other party. Accordingly, the user 118 and the selected entity 122 can view the same information in the same format in the shared user interfaces displayed in respective client devices.

Although the above acts are described to be performed by the communication-powered searching system 102, one or more acts that are performed by the communication-powered searching system 102 may be performed by the client device 104 or other software or hardware of the client device 104 and/or any other computing device (such as the one or more servers 108). For example, in response to detecting a selection of a communication link by the user 118, the client device 104 may activate a communication system therein to establish a channel for communication the communication-powered searching system 102. The client device 104 may further notify the communication-powered searching system 102 to act as a hub or platform by establishing a respective communication channel with a client device of an entity 122 associated with the selected communication link. The server 108 may obtain information exchanged between the user 118 and the entity 122, and refine search results based on the exchanged information. The server 108 may synchronize user interfaces displayed to the user 118 and the entity 122.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
receiving, by a server, a query from a device of a user;
sending, by the server, a plurality of search results for presentation at the device of the user, the plurality of search results comprising one or more information links that point to online information related to the query and one or more communication links to activate one or more communications between the device of the user and one or more entities upon a selection;
establishing, by the server, a communication channel between the device of the user and a device of an entity associated with a communication link from among the one or more communication links;
analyzing, by the server, information exchanged between the device of the user and the device of the entity through the communication channel; and
refining, by the server, the search results based at least in part on the analyzing of the information exchanged between the device of the user and the device of the entity through the communication channel.

2. The method as recited in claim 1, further comprising:
receiving a selection of the communication link from among the one or more communication links from the device of the user; and
wherein the establishing of the communication connection between the device the user and the device of the entity associated with the communication link is performed in response to the receiving of the selection.

3. The method as recited in claim 1, further comprising: sending the refined search results for presentation at the device of the user.

4. The method as recited in claim 1, further comprising: sharing a user interface of the device of the user that presents the search results with the device of the entity; and enabling the entity to provide additional or alternative search results to the user interface for presenting at the device of the user.

5. The method as recited in claim 4, further comprising prior to sharing the user interface of the user, receiving a confirmation from the device of the user to allow the sharing of the user interface with the device of the entity.

6. The method as recited in claim 1, further comprising determining a type of communication to be established for the communication connection between the device of the user and the device of the entity.

7. The method as recited in claim 6, wherein the type of communication comprises an email communication, an instant messaging communication, a video communication and/or an audio communication.

8. The method as recited in claim 6, wherein determining the type of communication comprises:
determining one or more communication preferences of the user and one or more communication preferences of the entity;
matching the one or more communication preferences of the user with the one or more communication preferences of the entity to determine a communication preference that is both allowed by the user and the entity; and
setting the type of communication based at least in part on the determined communication preference.

9. The method as recited in claim 6, wherein determining the type of communication comprises:
determining communication bandwidth between the device of the user and the device of the entity; and
selecting the type of communication from a plurality of types of communications based at least on the determined communication bandwidth and a ranking of the plurality of types of communication in a communication preference associated with the user.

10. The method as recited in claim 1, further comprising determining whether the user has signed in as a user of at least one user account, wherein the one or more communication links comprise links to one or more user accounts.

11. The method as recited in claim 1, further comprising:
determining that the user has not signed in as a user of at least one user account associated with a communication link; and
wherein the one or more entities include one or more anonymous users.

12. The method as recited in claim 1, further comprising:
determining that the user has signed in as a user of at least one user account; and
sending identification information of the one or more entities for presentation at the device of the user.

13. The method as recited in claim 1, further comprising:
determining that the user has not signed in as a user of at least one user account;
sending information of the one or more entities as one or more anonymous users for presentation at the device of the user;
receiving login information from the device of the user usable to log into a user account; and
in response to receiving the login information, sending identification information of the one or more entities for presentation at the device of the user.

14. The method as recited in claim 1, wherein:
analyzing the information exchanged between the device of the user and the device of the entity comprises extracting, by the server, one or more keywords from the information exchanged between the device of the user and the device of the entity; and
refining the search results comprises retrieving, by the server, refined search results based at least in part on the one or more keywords.

15. The method as recited in claim 1, wherein:
analyzing the information exchanged between the device of the user and the device of the entity comprises determining a context associated with the information exchanged between the device of the user and the device of the entity; and
refining the search results comprises retrieving, by the server, refined search results based at least in part on the context.

16. One or more computer storage media storing computer-executable instructions that, when executed by one or more processors, cause the one or more processors to perform acts comprising:
receiving an input, the input including a query;
receiving, from a server, search results related to the query, the search results comprising one or more communication links;
receiving a selection of a communication link of the one or more communication links;
enabling communication with a device of an entity associated with the communication link through a communication channel;
receiving, from the server, an updated query and refined search results that are based at least in part on the updated query, wherein the updated query is based at least in part on an analysis of information exchanged with the device of the entity through the communication channel; and
displaying the refined search results.

17. The one or more computer storage media as recited in claim 16, further comprising:
determining that a user has not signed in as a user of a network account; and
in response to determining that the user has not signed in as a user of a network account, requesting that the communication be an anonymous communication without disclosing an identity of the user to the entity.

18. The one or more computer storage media as recited in claim 16, further comprising receiving an instruction to share a user interface with the entity, wherein the refined search results are obtained based at least in part on synchronization of the user interface with the device of the entity.

19. The one or more computer storage media as recited in claim 16, wherein a communication account used by a device that is receiving the updated query does not belong to a same communication system of a communication account used by the device of the entity.

20. A system comprising:
one or more processors;
memory storing computer-execution instructions that, when executed by the one or more processors, cause the one or more processors to perform acts comprising:
receiving a query from a device of a user;
sending a plurality of search results for presentation at the device of the user, the plurality of search results comprising one or more information links that point to online information related to the query and one or more communication links to activate one or more communications between the device of the user and one or more entities upon a selection;

receiving, from the device of the user, an indication of a selection of a communication link from the one or more communication links, wherein the communication link is associated with an entity;

sending a user interface of the device of the user to a client device of the entity, the user interface including the query;

receiving, from the client device of the entity, a modification to the query included in the user interface;

updating the query included in the user interface based at least in part on the modification received from the client device of the entity;

analyzing the updated query included in the user interface;

refining, based at least in part on the analyzing, the plurality of search results in order to generate a plurality of refined search results; and sending the updated query and the plurality of refined search results to the device of the user.

* * * * *